Nov. 1, 1949

G. HEPP
2,486,843
CIRCUIT FOR PHASE MODULATION
OF ELECTRIC OSCILLATIONS
Filed July 16, 1946

INVENTOR.
GERARD HEPP
BY
ATTORNEY.

Patented Nov. 1, 1949

2,486,843

UNITED STATES PATENT OFFICE 2,486,843

CIRCUIT FOR PHASE MODULATION OF ELECTRIC OSCILLATIONS

Gerard Hepp, Eindhoven, Netherlands, assignor to Hartford National Bank and Trust Company, Hartford, Conn., as trustee Application July 16, 1946, Serial No. 684,068
In the Netherlands May 29, 1943

Section 1, Public Law 690, August 8, 1946
Patent expires May 29, 1963

8 Claims. (Cl. 332—18)

This invention relates to a circuit for phase modulation of electric oscillations in which the phase modulation is set up by feeding these oscillations to a network comprising several cells each of which contains at least one impedance whose magnitude is influenced by the modulating oscillation and in which negative feedback of the modulating oscillation is used.

It has been suggested before to back couple the modulated oscillation in order to secure a linear relation between the magnitude of a modulating oscillation and the phase displacement of the modulated oscillation. For this purpose, the modulating oscillation was fed to a device for detecting phase-modulated oscillations and the voltage of the modulating oscillation obtained from this detector was used for the negative feedback. This manner of backcoupling is, however, found to lead in practice to a highly involved circuit. The invention has for its object to provide a circuit in which the negative feedback referred to can be achieved in a simple manner.

According to the invention, this is achieved by taking from at least one of the cells of the said network a voltage of the modulated oscillation whose amplitude is proportionate to the phase displacement brought about by the modulation, by rectifying this voltage and by using the rectified voltage for the said negative feedback.

In a highly efficient embodiment of the present invention the input terminals of each cell have interconnected between them the series combination of a capacity, an inductance and a resistance, said series combination being tuned to the frequency of the oscillations to be modulated, and the input terminals of the next following cell are connected to the said resistance.

The voltage of the modulated oscillation may be obtained direct, in some cases with the interposition of blocking condensers, from the said inductance or from the said capacity. As an alternative, this voltage may be obtained from the said inductance for example by inductive coupling.

In order that the invention may be clearly understood and readily carried into effect it will now be described more fully with reference to the accompanying drawing forming a part of the specification and in which.

Figure 1:
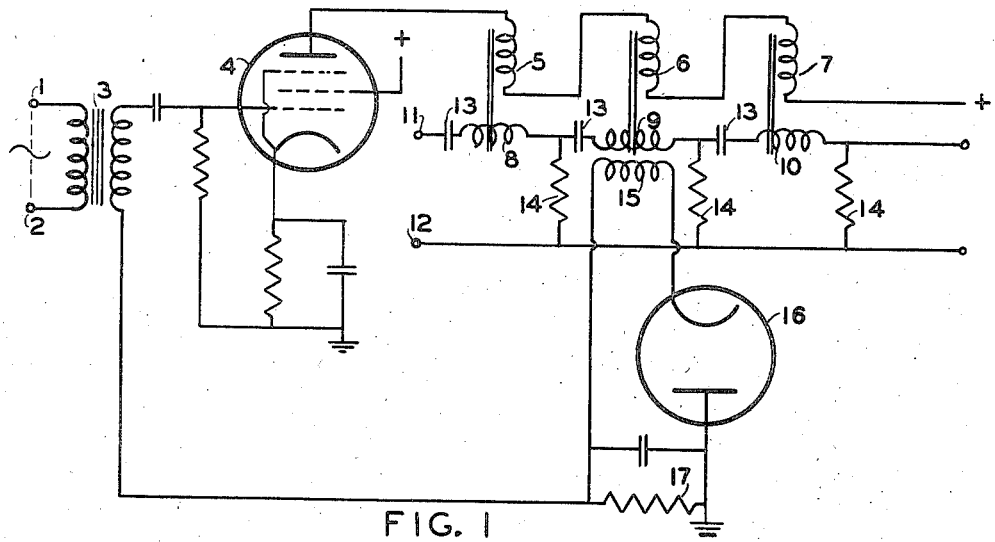
Fig. 1 shows a circuit arrangement for phase modulation in which the negative feedback of the modulated oscillation is carried out in accordance with the invention.

Referring to Fig. 1 there is shown a circuit arrangement in which a modulating oscillation is fed to the terminals 1 and 2 to which the primary of a transformer 3 is connected. The voltage generated in the secondary is led to the control grid of a pentode 4. The anode current of this pentode passes in succession through the windings of several small series-connected magnetizing coils 5, 6 and 7 each of which influences the magnetization of one of the cores of three inductances 8, 9 and 10.

The oscillation to be modulated is fed to the input terminals 11 and 12 of the network by means of which the phase modulation is set up. The network comprises three cells; the first cell contains the series combination of a condenser 13, the inductance 8 and a resistance 14. The second cell is connected to the resistance of the first cell and contains a similar series combination in which, however, an inductance coil 9 takes the place of the coil 8. The third cell is constituted and connected in a manner similar to the second cell, but the inductance coil 10 takes the place of the coil 9. The phase-modulated oscillation is obtained from the output terminals of the resistance of this cell.

The series combinations formed by one of the condensers 13 and one of the coils 8, 9 and 10 respectively are each tuned to the frequency of the oscillations to be modulated.

The phase modulation due to the fact that the magnetization of the cores of the coils 8, 9 and 10, and thus the inductance of these coils is varied in the rhythm of the modulating oscillation due to the current that passes through the magnetizing coils 5, 6 and 7.

Primarily due to the fact that there is no completely linear relation between the magnitude of the modulating oscillation and the variation of the inductance of the coils 8, 9 and 10, the phase displacement brought about by the modulation does not entirely vary directly as the magnitude of the modulating oscillation. The divergence from this proportionality can be obviated substantially by the use of negative feedback of the modulating oscillation.

According to the invention, for this purpose at least one of the cells of the network has taken from it a voltage of the modulated oscillation whose amplitude is proportional to the phase displacement brought about by the modulation. In the circuit arrangement shown in Fig. 1 this is achieved by inductively coupling a coil 15 to the inductance coil 9. The phase displacement obtained in a single cell of the network is so minute that the amplitude of the modulated current is proportional to the phase displacement brought about by this cell and hence also to the phase displacement brought about by the entire network. The voltage induced in the coil 15 is rectified at a rectifier stage in the usual manner by means of a diode 16. The rectified voltage is taken from the output resistance 17 of the rectifier stage and is fed, in antiphase with the voltage induced in the secondary of the transformer 3, to the control grid of the pentode 4.

Figure 2:
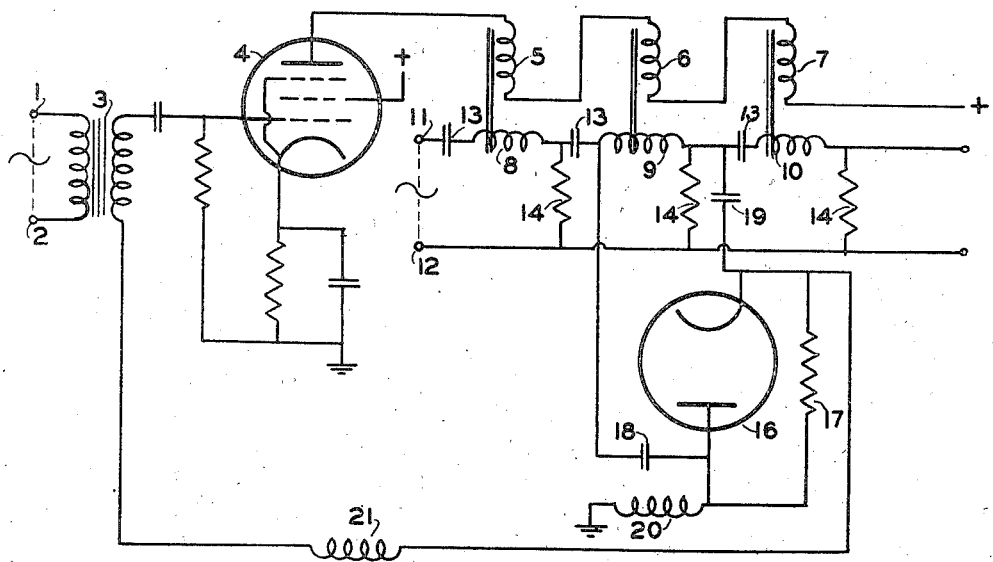
Fig. 2 shows an alternate circuit arrangement for phase modulation in which the negative feedback of the modulated oscillation is carried out according to the invention.

As an alternative, the voltage of the modulated oscillation may be obtained direct from the network. A pertinent embodiment is shown in Fig. 2, the voltage of the modulated oscillation being obtained direct from the inductance coil 9 by means of two condensers 18 and 19. In order to prevent voltages of the modulated oscillation being fed to the control grid of the pentode 4 one end of the output resistance 17 is connected to earth via a choke coil 20 and the other end to the secondary of the transformer 3 via a choke coil 21. These choke coils constitute a high impedance for the frequency of the modulated oscillation but allow the almost unhampered passage of the modulating oscillation.

In the foregoing embodiment, the voltage of the modulated oscillation was taken from one definite cell of the network only; it is, however, also possible to take the voltage concerned from a plurality of cells so far as the condition is satisfied that the amplitude of the said voltage should be proportional to the phase displacement brought about by the modulation, or in other words that the magnitude of the rectified voltage obtained from the output resistance 17 should be substantially proportional to the phase displacement of the modulated oscillation.

What I claim is:

1. A circuit arrangement for phase-modulating an electric wave, comprising a network having a plurality of branches connected in cascade, each of said branches comprising a core member of ferromagnetic material, a high frequency induction coil arranged on said core and a magnetizing winding, means to apply said electric wave to said network, means to apply modulating potentials to the magnetizing winding of said branches to vary the permeability of the associated core member and produce changes in the magnetic fluxes produced therein to phase-modulate said electric wave, means coupled to the induction coil of one of said branches to derive a voltage proportional to the phase displacement produced by said modulating potentials, and means to combine said voltage in negative feedback relationship with said modulating potentials thereby to produce a phase displacement of said wave linearly proportional to said modulating potentials.

2. A circuit arrangement for phase-modulating an electric wave, comprising a network having a plurality of branches connected in cascade, each of said branches comprising a core member of ferromagnetic material, a high frequency induction coil arranged on said core and a magnetizing winding, means to tune each of said branches to the frequency of said electric wave, means to apply said electric wave to said network, means to apply modulating potentials to the magnetizing winding of said branches to vary the permeability of the associated core member and produce changes in the magnetic fluxes produced therein to phase-modulate said electric wave, means coupled to the induction coil of one of said branches to derive a voltage having amplitude variations proportional to the phase displacement produced by said modulating potentials, and means to combine said voltage in negative feedback relationship with said modulating potentials thereby to produce a phase displacement of said wave linearly proportional to said modulating potentials.

3. A circuit arrangement for phase-modulating an electric wave, comprising a network having a plurality of branches connected in cascade, each of said branches comprising a core member of ferromagnetic material, a high frequency induction coil arranged on said core, a capacitor connected in series with said coil, a resistor connected in shunt with said branch and a magnetizing winding, the input of each of the succeeding branches being connected across the resistor of the preceding branch, said branches being tuned to the frequency of said electric wave, means to apply said electric wave to said network, means to apply modulating potentials to the magnetizing winding of said branches to vary the permeability of the associated core member and produce changes in the magnetic fluxes produced therein to phase-modulate said electric wave, means coupled to the induction coil of one of said branches to derive a voltage having amplitude variations proportional to the phase displacement produced by said modulating potentials, and means to combine said voltage in negative feedback relationship with said modulating potentials thereby to produce a phase displacement of said wave linearly proportional to said modulating potentials.

4. A circuit arrangement for phase-modulating an electric wave, comprising a network having a plurality of branches connected in cascade, each of said branches comprising a core member of ferromagnetic material, a high frequency induction coil arranged on said core, a capacitor connected in series with said coil, a resistor connected in shunt with said branch and a magnetizing winding, the input of each of the succeeding branches being connected across the resistor of the preceding branch, said branches being tuned to the frequency of said electric wave, means to apply said electric wave to said network, means to apply modulating potentials to the magnetizing winding of said branches to vary the permeability of the associated core member and produce changes in the magnetic fluxes produced therein to phase-modulate said electric wave, means inductively coupled to the induction coil of one of said branches to derive a voltage having amplitude variations proportional to the phase displacement produced by said modulating potentials, and means to combine said voltage in negative feedback relationship with said modulating potentials thereby to produce a phase displacement of said wave linearly proportional to said modulating potentials.

5. A circuit arrangement for phase-modulating an electric wave, comprising a network having a plurality of branches connected in cascade, each of said branches comprising a core member of ferromagnetic material, a high frequency induction coil arranged on said core, a capacitor connected in series with said coil, a resistor connected in shunt with said branch and a magnetizing winding, the input of each of the succeeding branches being connected across the resistor of the preceding branch, said branches being tuned to the frequency of said electric wave, means to apply said electric wave to said network, means to apply modulating potentials to the magnetizing winding of said branches to vary the permeability of the associated core member and produce changes in the magnetic fluxes produced therein to phase-modulate said electric wave, means capacitively coupled to the induction coil of one of said branches to derive a voltage having amplitude variations proportional to the phase displacement produced by said modulating potentials, and means to combine said voltage in negative feedback relationship with said modulating potentials thereby to produce a phase displacement of said wave linearly proportional to said modulating potentials.

6. A circuit arrangement for phase-modulating an electric wave, comprising a network having a plurality of branches connected in cascade, each of said branches comprising a core member of ferromagnetic material, a high frequency induction coil arranged on said core, a capacitor connected in series with said coil, a resistor connected in shunt with said branch and a magnetizing winding, the input of each of the succeeding branches being connected across the resistor of the preceding branch, said branches being tuned to the frequency of said electric wave, means to apply said electric wave to said network, means to apply modulating potentials to the magnetizing winding of said branches to vary the permeability of the associated core member and produce changes in the magnetic fluxes produced therein to phase-modulate said electric wave, a pickup winding inductively coupled to the induction coil of one of said branches, a rectifier and a load resistor therefor coupled to said pickup winding to derive across said load resistor a voltage having amplitude variations proportional to the phase displacement produced by said modulating potentials, and means to combine said derived voltage in opposition to said modulating potentials thereby to produce a phase displacement of said wave linearly proportional to said modulating potentials.

7. A circuit arrangement for phase-modulating an electric wave, comprising a network having a plurality of branches connected in cascade, each of said branches comprising a core member of ferromagnetic material, a high frequency induction coil arranged on said core, a capacitor connected in series with said coil, a resistor connected in shunt with said branch and a magnetizing winding, the input of each of the succeeding branches being connected across the resistor of the preceding branch, said branches being tuned to the frequency of said electric wave, means to apply said electric wave to said network, means to apply modulating potentials to the magnetizing winding of said branches to vary the permeability of the associated core member and produce changes in the magnetic fluxes produced therein to phase-modulate said electric wave, a rectifier and a load resistor associated therewith, means capacitively coupling said rectifier across the induction coil of one of said branches to develop across said load resistor a voltage having amplitude variations proportional to the phase displacement produced by said modulating potentials, and means to combine said developed voltage in opposition to said modulating potentials thereby to produce a phase displacement of said wave linearly proportional to said modulating potentials.

8. A circuit arrangement for phase-modulating an electric wave, comprising a network having a plurality of branches connected in cascade, each of said branches comprising a core member of ferromagnetic material, a high frequency induction coil arranged on said core, a capacitor connected in series with said coil, a resistor connected in shunt with said branch and a magnetizing winding, the input of each of the succeeding branches being connected across the resistor of the preceding branch, said branches being tuned to the frequency of said electric wave, means to apply said electric wave to said network, means to apply modulating potentials to the magnetizing winding of said branches to vary the permeability of the associated core member and produce changes in the magnetic fluxes produced therein to phase-modulate said electric wave, a rectifier and a load resistor associated therewith, means capacitively coupling said rectifier across the induction coil of one of said branches to develop across said load resistor a voltage having amplitude variations proportional to the phase displacement produced by said modulating potentials, a choke coil having a high impedance value at the frequency of said electric wave and being coupled to said load resistor to suppress amplitude variations of the frequency of said electric wave, and means to combine said developed voltage in opposition to said modulating potentials thereby to produce a phase displacement of said wave linearly proportional to said modulating potentials.

GERARD HEPP.

REFERENCES CITED

The following references are of record in the file of this patent:

UNITED STATES PATENTS

| Number | Name | Date |
| --- | --- | --- |
| 2,085,418 | Crosby | June 29, 1937 |
| 2,279,660 | Crosby | Apr. 14, 1942 |
| 2,321,269 | Artzt | June 8, 1943 |
| 2,354,799 | Crosby | Aug. 1, 1944 |